Figure 1:
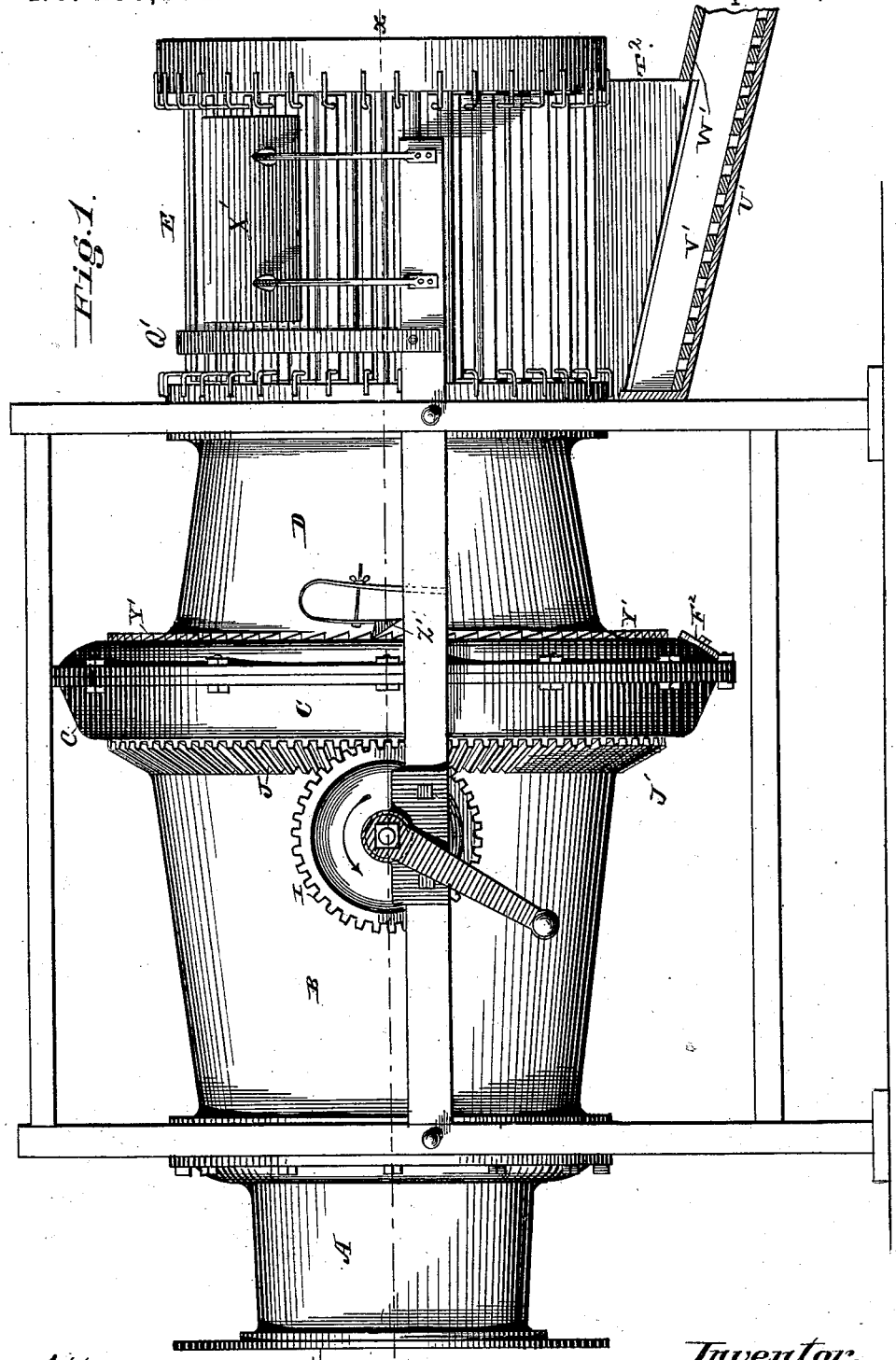

(No Model.)
6 Sheets—Sheet 1.

J. H. WILHELM.
ORE SEPARATOR AND CONCENTRATOR.

No. 256,184. Patented Apr. 11, 1882.

Attest:
H. L. Perrine
J. A. Vickers.

Inventor.
John H. Wilhelm
by H. A. Seymour
Atty (No Model.) 6 Sheets—Sheet 2.
J. H. WILHELM.
ORE SEPARATOR AND CONCENTRATOR.
No. 256,184. Patented Apr. 11, 1882.
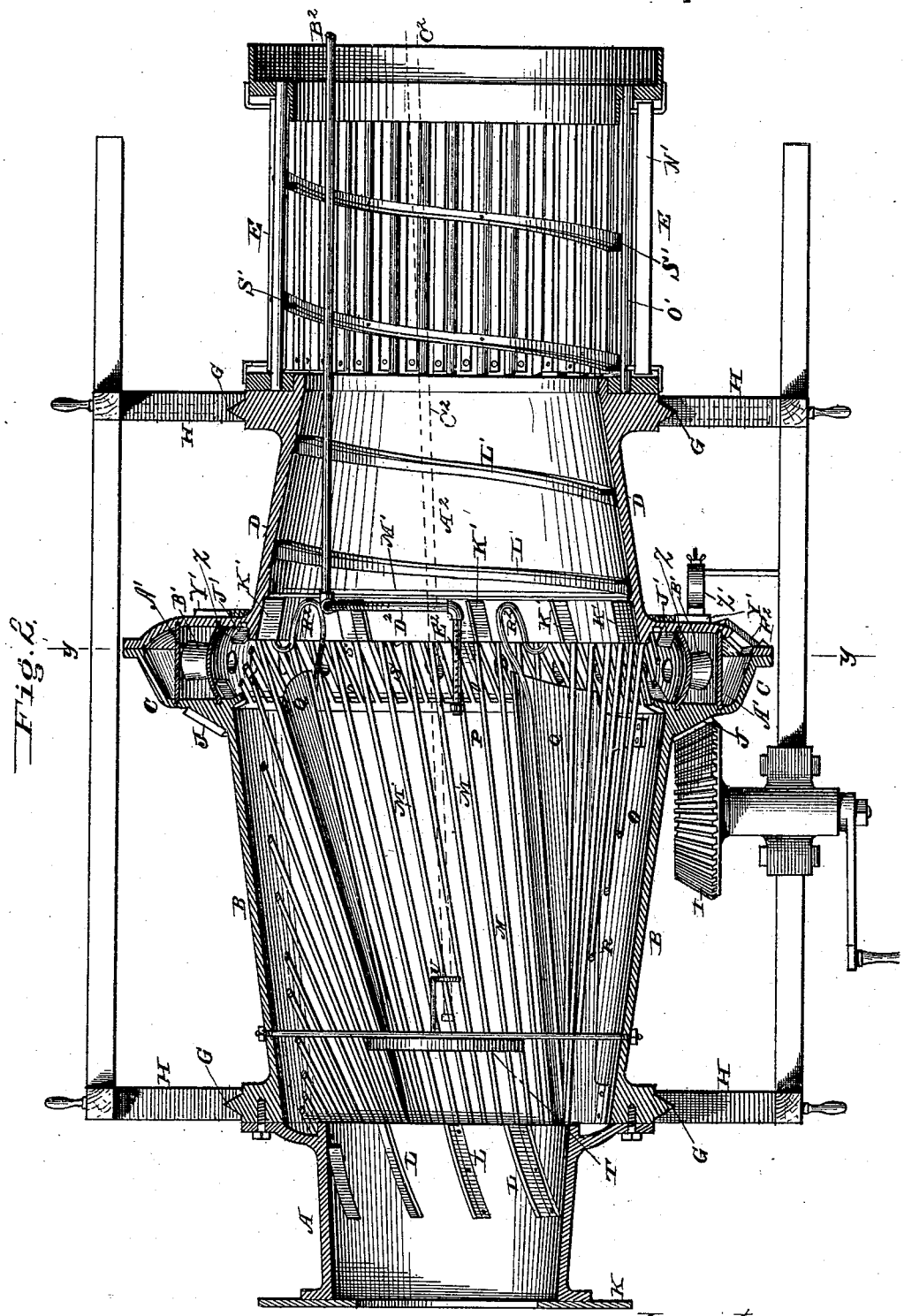

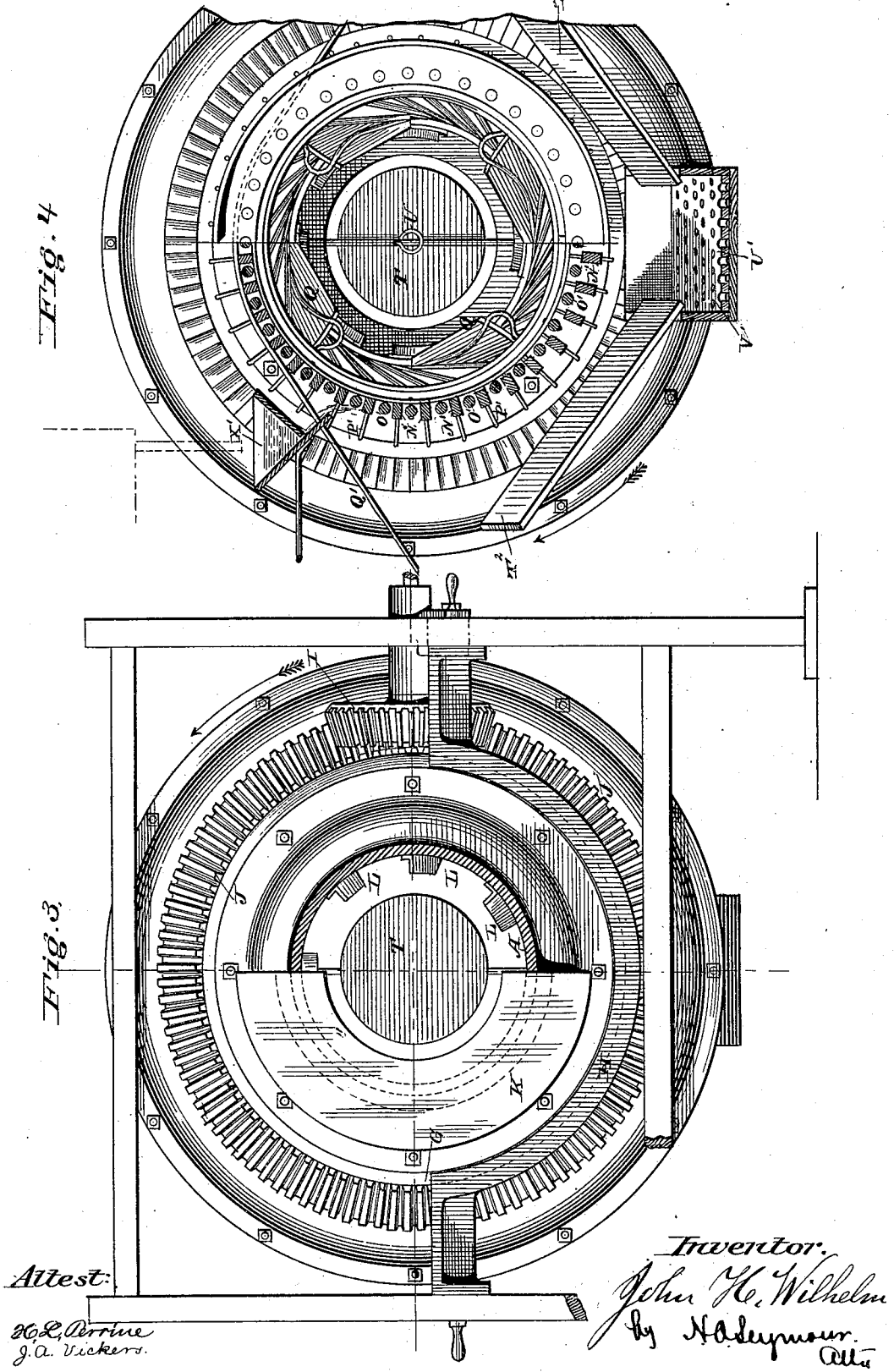

(No Model.) 6 Sheets—Sheet 4.
J. H. WILHELM.
ORE SEPARATOR AND CONCENTRATOR.
No. 256,184. Patented Apr. 11, 1882.
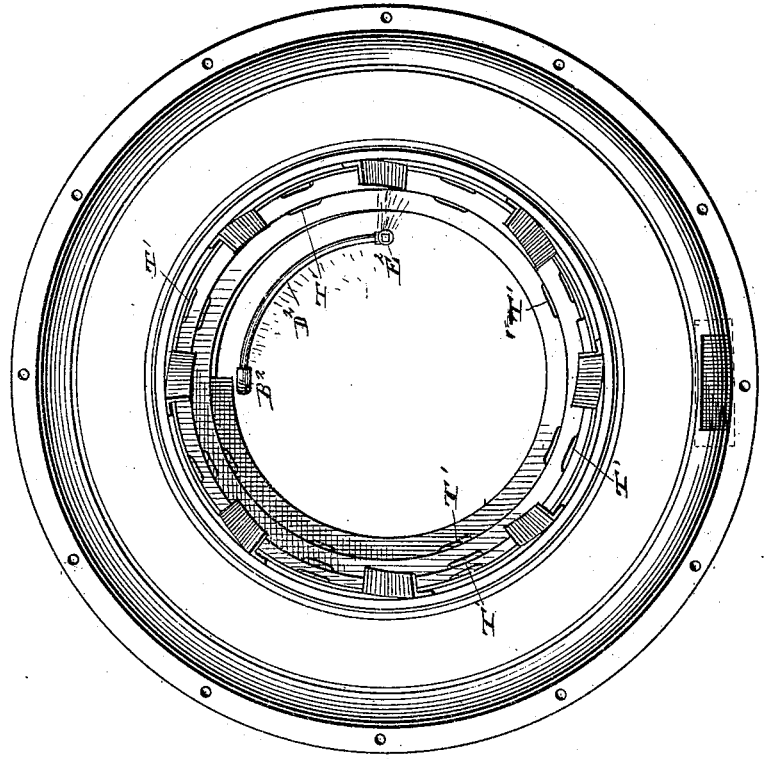
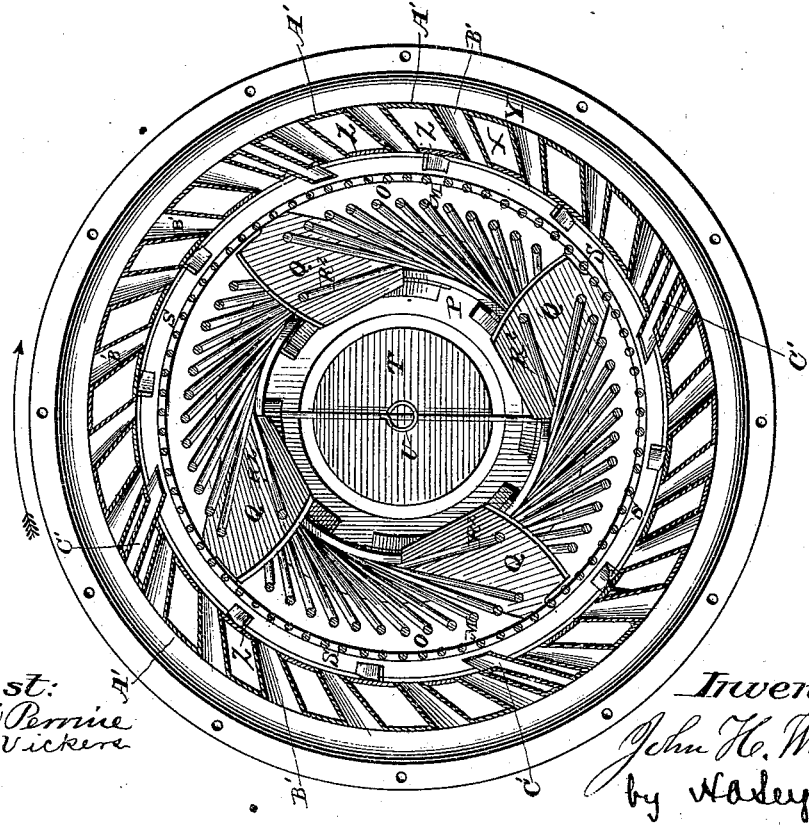

(No Model.) 6 Sheets—Sheet 5.
J. H. WILHELM.
ORE SEPARATOR AND CONCENTRATOR.
No. 256,184. Patented Apr. 11, 1882.
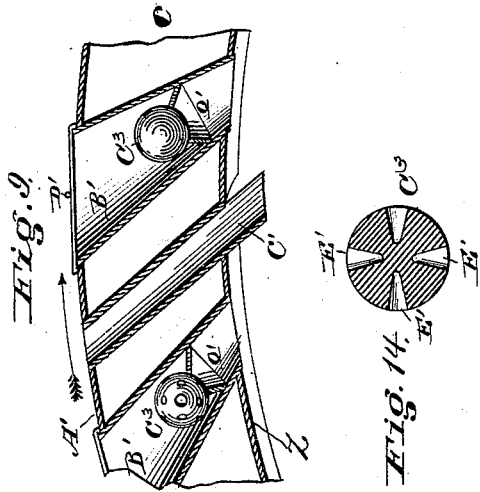
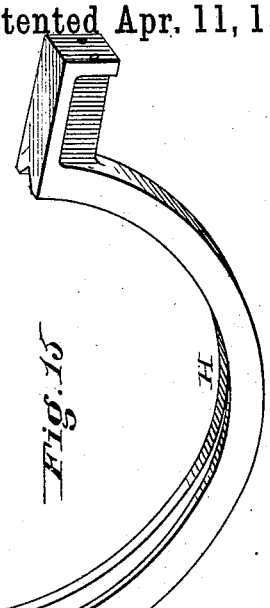
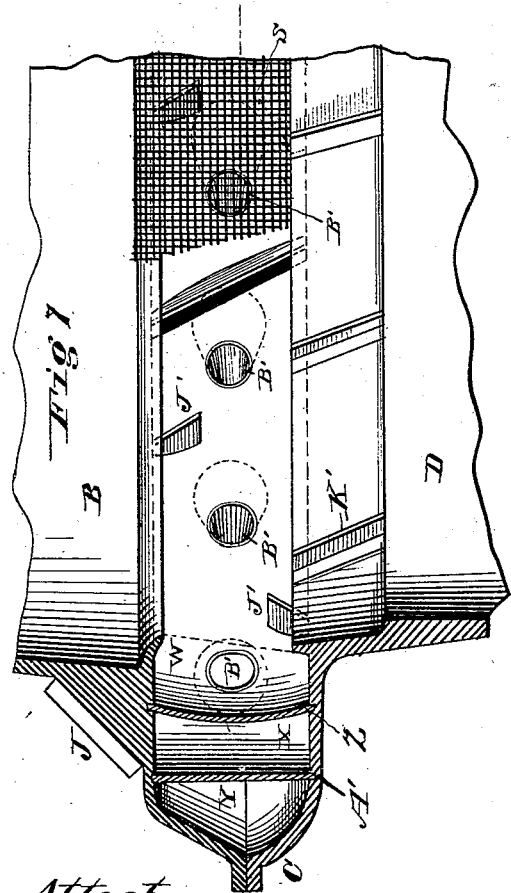
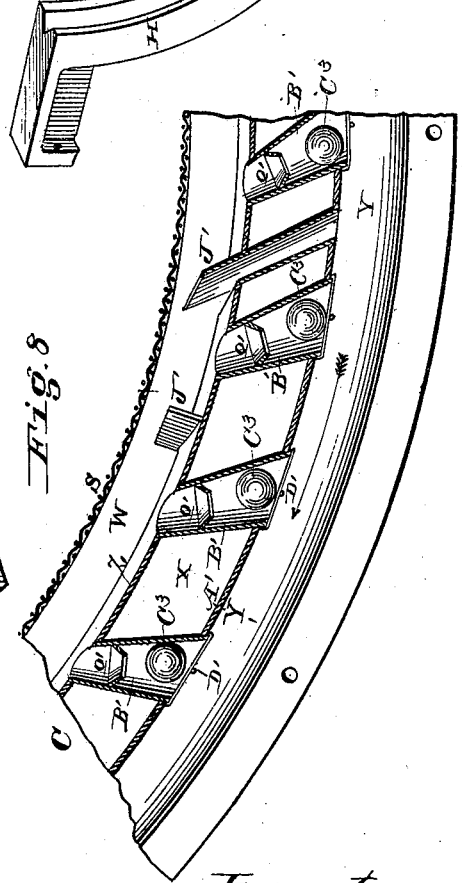
Attest:
H. L. Perrine
J. A. Vickers
Inventor:
John H. Wilhelm
by H. A. Seymour.
Atty.
N. PETERS, Photo-Lithographer, Washington, D. C.

(No Model.) 6 Sheets—Sheet 6.
J. H. WILHELM.
ORE SEPARATOR AND CONCENTRATOR.
No. 256,184. Patented Apr. 11, 1882.
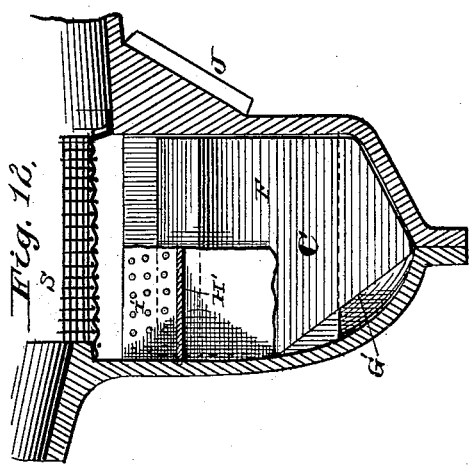
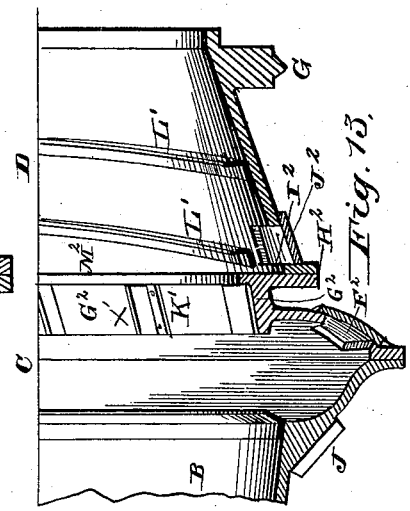
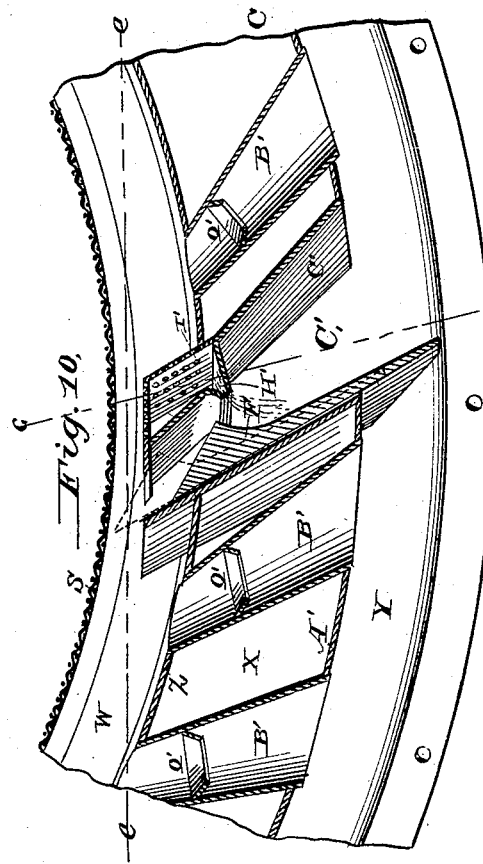
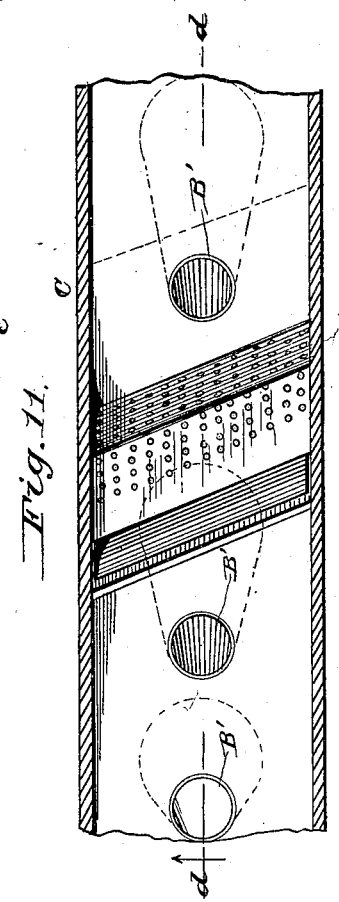
Attest:
H. L. Perrine
J. A. Vickers
Inventor
John H. Wilhelm
by H. A. Seymour
Atty.

UNITED STATES PATENT OFFICE.

JOHN H. WILHELM, OF DENVER, COLORADO.

ORE SEPARATOR AND CONCENTRATOR.

SPECIFICATION forming part of Letters Patent No. 256,184, dated April 11, 1882.

Application filed June 24, 1881. (No model.)

*To all whom it may concern:*

Be it known that I, JOHN H. WILHELM, of Denver, in the county of Arapahoe and State of Colorado, have invented certain new and useful Improvements in Ore Separators and Concentrators; and I do hereby declare the following to be a full, clear, and exact description of the invention, such as will enable others skilled in the art to which it pertains to make and use it, reference being had to the accompanying drawings, which form part of this specification.

My invention relates to mining apparatus designed to be employed, for the most part without the aid of quicksilver, in the extraction of gold of every character from the auriferous débris of placer mines, but having an actual field of usefulness of far wider scope, inasmuch as it is admirably adapted to treat pulverized and free-milling ores for their mineral, to be employed in those situations where the character of the ore renders amalgamators and chemical agencies necessary, and to perform the twofold functions of separator and concentrator.

The primary object of my invention is to save a maximum amount of mineral with a minimum outlay of time and labor.

Further objects of my invention are to provide apparatus adapted to extract mineral with or without the auxiliary aids of water, quicksilver, and steam, and to be advantageously employed in those situations where the inclination of the ground is not sufficient to set the ordinary sluice to advantage, and also where the gold occurs in such finely-comminuted form as to evade the various processes hitherto employed to save it.

In the accompanying drawings, Figure 1 is a view in side elevation of a device constructed in accordance with my invention. Fig. 2 is a view in central horizontal section, taken through line *x x* of Fig. 1. Fig. 3 is a view chiefly in elevation, but partly in section, of the front of the apparatus. Fig. 4 is a view in elevation of the rear of the apparatus, with the screen of cylinder E partly in section. Fig. 5 is a view in vertical cross-section, taken through line *y y* of Fig. 2 and looking toward the front of the apparatus. Fig. 6 is a similar view taken through line *y y* of Fig. 2 and looking toward the rear of the apparatus. Fig. 7 is a view in horizontal section of the mineral-receptacle. Figs. 8 and 9 are vertical sectional views thereof. Fig. 10 is a view of the mineral-receptacle in vertical section. Fig. 11 is a horizontal view thereof, taken through line *e e* of Fig. 10. Fig. 12 is a view in vertical section of the mineral-receptacle through line *c c* of Fig. 10. Fig. 13 is a modification of the cylinder D. Fig. 14 is a view in cross-section of one of the ball-valves provided with conical cavities, and Fig. 15 is a perspective view of one of the bearings upon which the apparatus is mounted.

The principle involved in my improved apparatus is that of specific gravity, by virtue of which all bodies suspended in an ethereal or liquid medium fall through it with a rapidity directly proportional to their density. In the application of this principle to the separation of gold from the auriferous débris of placer mines and to the treatment of other ores, as above stated, I have invented an apparatus, herein shown as consisting of five cylindrical chambers arranged to be revolved, and provided with mechanical devices adapted to grade the constituent particles of the débris or ore treated, according to their size and density, the lighter and worthless particles being rejected, all particles of gold and other substances or metals having substantially the same specific gravity being retained.

The apparatus shown consists, as aforesaid, in five separate cylindrical chambers, A, B, C, D, and E, firmly secured together and horizontally supported in a suitable structure of frame-work. It is, however, apparent that instead of forming the casing of the apparatus in separate sections and securing them to one another two or more, or even all of the said sections, may, if desired, be consolidated into one.

Of the cylinder E it may be said that as in many situations it can be dispensed with it should generally be constructed as a distinct element of the apparatus, capable of being readily attached thereto or detached therefrom.

The cylinders A, B, C, and D, or the three last alone, may be formed as shown in the accompanying drawings; or they may be embodied in a single casting; or, again, they may be cast in horizontal sections adapted to be secured together. Also, the cylinder C, which constitutes, with its interior mechanism, the mineral-receptacle of the apparatus, and which is, as here shown, formed by the conjunction of the flaring inner ends of the cylinders B and D, may, if desired, be constructed as an independent chamber adapted to be interposed between the said cylinders. The outer ends of the cylinders B and D are encircled by guides G, made integral therewith or attached thereto, and adapted to be received in grooved semicircular bearings H, suspended between the opposite sides of the frame supporting the apparatus.

The several cylinders, rigidly joined together, are simultaneously revolved by means of a bevel-gear wheel, I, secured to the framework of the apparatus, and adapted to engage with bevel-teeth J, formed on the outer face of the flaring inner end of chamber B. Motion may be imparted to the bevel-gear I, and hence to the cylinders, from any desired motor proportionally powerful to the size of the apparatus, the character of the débris to be concentrated, and the rapidity with which it is desired to perform the work. In most instances, especially in placer mining, hand-power will amply fulfill all requirements, inasmuch as the interior and exterior structural arrangement of the parts of the machine is designed to adapt it to run very easily and to be used in those situations where artificial motive force is not readily obtainable.

It must be apparent that from the numerous devices for transmitting rotary motion others may be chosen and adapted to the requirements of the apparatus in lieu of the bevel-gearing shown.

The cylinder A, constituting the receiver of the apparatus, is securely bolted to the outer end of the cylinder B, and is provided with my annular flange K, encircling its free end. This flange is designed to prevent the débris as it is delivered into the mouth of the said cylinder from being thrown forward onto the bearings G. The débris is assisted in rapid transit through this said cylinder by means of guides L, secured in angular disposition to the inner peripheral face thereof.

The cylinder B is provided with a series of inclined rods, m, forming, when taken together, a conical screen for grading the débris, and in effect dividing the cylinder into two concentric chambers, O and P. Of these the former encircles the latter, which is inclosed within the rods.

Dashers Q, secured to the inner peripheral face of the cylinder B, are interposed between the rods m, and project into chamber P, above described. The lower edges of the said dashers are cut away, as at R, in order not to interrupt the continuity of the chamber O, while their blade-shaped inner ends are concaved to increase their capability of carrying water, when used, forward and pouring it into the mineral receptacle or cylinder C. The concave form of the dashers is clearly seen in Fig. 5 of the drawings. Bent rods or frames $R^2$, interposed also in the screen formed of the rods M and located in close proximity to the dashers Q, are adapted to aid in lifting the larger rocks and bowlders of the débris over the screen S, which separates the chamber C from chambers B and D. The rods M and $R^2$ and dashers Q are also arranged relatively to each other with special reference to preventing the annular chamber O from becoming clogged. The arrangement devised consists in leaving wider passages or spaces between the dashers and those particular rods of the rods M which adjoin them than the spaces intervening between any two of the said rods, thereby allowing the stones that fall through the conical screen formed of rods M into the annular chamber O to have egress therefrom through these wide passages. In issuing from the said passages stones fall onto the dashers Q, by which they are carried forward and deposited on the fine screen or grating S, from which they are removed as the cylinders revolve by the bent inner ends of the rods or frames $R^2$. The bent rods are shown as located in immediate proximity to the dashers and the wide passages just described; but they are not limited to this adjustment, as they may be disposed with good effect in any other portion of the rod-screen. The functions of the said dashers are manifold. They operate to repeatedly lift the débris and dash it down again to insure the perfect separation of its mineral element, they aid the progress of the whole mass of the débris through the chamber B, they carry the heavier bowlders forward, they receive the smaller bowlders as they are thrown from chamber O and deposit them on the screen S, and they collect and pour water, when used, into the cylinder C, thus preventing it from becoming clogged.

A disk, T, located centrally of the cylinder B and near its outer end, is designed to deflect the débris as it enters the cylinder in all directions, and thus insure its perfect assimilation to the process of the apparatus. A ring, U, depending from the inner face of the said disk, supports the inner end of the water-pipe $C^2$, to be hereinafter described.

The annular chamber or cylinder C, formed, as before explained, by the union of the flaring inner ends of the cylinders B and D, is separated from them by a screen, S, of any desired construction, depending largely on the character of the débris to be treated. In Fig. 2 of the drawings the screen S assumes the form of a grating. In Fig. 5 it is shown as constructed of parallel rods with narrow interposing spaces between them, and in Figs. 7, 8, 10, and 12 it assumes the form of wire mesh. In all of these different forms it subserves the same function, and will in every instance be designated by the same letter of reference.

The mineral-receptacle or cylinder C is divided into three concentric compartments, W, X, and Y, by partition-plates Z and A'. Communication between the compartments W and Y is established through conical passages B', interposed in the intermediate compartment, X, and also by passages C'. The smaller ends of said conical passages, which are arranged tangentially to the periphery of the mineral-receptacle, open into the inner compartment, W. Inclined rims o', inserted within the passages near their narrower diameters, are designed to give greater effect to the water which washes the débris and carries the mineral through the same. The rims also operate to prevent any particles of mineral that may have lodged in the said passages at points below them from falling back into the inner compartment, W, when the said passages are inverted by the revolution of the apparatus. As an additional safeguard against the escape of mineral out of the mineral-receptacle under the conditions aforesaid, balls $C^3$ are placed within the conical passages and retained therein by wires D', as shown in Figs. 8 and 9 of the drawings. Usually the ball-valves $C^3$ are solid; but when it is desired to make the working parts of the apparatus as light as possible, and the character of the mineral being extracted from the débris does not demand that the conical passages be perfectly closed by the ball-valves, they may be traversed by conical cavities E'. The balls also serve to increase the agitation in the said passages, as they have considerable movement therein, and not only aid in more perfectly separating the mineral from the débris, but also prevent the passages from being clogged by it.

Aside from that communication between the compartments W and Y which is obtained through the conical passages B', communication is had between them through passages C', which extend laterally across the mineral-receptacle, and which are located between the said conical passages. The passages C', which are best shown in Figs. 10 and 12 of the drawings, are broader at their outer extremities, which open into the compartment Y, than at their inner extremities, which open into the compartment W, the object of this construction being to prevent large bowlders from passing through them, and yet to afford free and unobstructed passage to the débris. Weighted slides F are adapted to be actuated in reciprocating movement in the said passages C' by the revolution of the apparatus to open and close communication between the compartments W and Y. When the passages are open the lower ends of the slides rest on the bottom of the compartment Y; but the continuity thereof is left unbroken by cutting away one side of the slides, as shown at G' in Fig. 12. The finer portions of the débris are washed through the cones B' into the outer compartment, while the nuggets fall thereinto through the passages C', above described. When in the motion of the apparatus the slides F are inverted from the position in which one is shown in Figs. 10 and 12 they will close the passages C', and in so doing throw out a portion of the débris that has fallen into the same. The dotted outline of a slide, which is introduced into the same figures of the drawings, shows the position of the slides when they are in closed adjustment. A portion of the sand and light particles of débris that has been conveyed from the inner compartment, W, to the outer compartment, Y, will by the action of the water work through into the inner chamber again and be carried away and discharged from the apparatus through devices therefor provided.

Narrow openings H', covered by screens I' of any suitable character, act as spouts to throw small streams of water into the passages C' to wash back into the outer compartment, Y, any particles of mineral that may tend to escape over the slides F or through the said passages when the said slides are dispensed with.

The wings or breakers J' (shown in Figs. 2, 5, 7, and 8 of the drawings and located in the inner compartment, W) are designed to agitate the water and débris and direct currents thereof toward the conical passages B'.

To increase the tendency of the mineral to fall to the lowest point of the cylinders, and especially of the mineral-receptacle C, a pounding device (shown in Fig. 1 of the drawings) is employed. This consists in a spring-pressed ratchet, Z', adapted to engage with a series of face ratchet-teeth, Y', encircling the cylinder C. As the cylinder revolves the disengagement of the ratchet with one tooth and its engagement with the next succeeding tooth will be accompanied by a sharp blow, which will tend to throw the contents of the several cylinders to their lowest points, and as the particles fall with a rapidity directly proportional to their density the heavier particles, representing the mineral element, will reach the bottom of the cylinders first, and thus become separated from the mass of the débris; but irrespective of this function the pounding device does valuable work in preventing the interior mechanism of the cylinders from becoming clogged. The conical passages B' and C' of cylinder C, and their respective valves and slides, are in particular kept in perfect working order by its action.

The mineral-receptacle is provided with doors $F^2$, through which the mineral is withdrawn from it. These doors, which are shown in Figs. 1 and 2 of the drawings, may be of any desired construction—as, for instance, they may be pivotally secured to one of the outer walls of the said receptacle, they may be adapted to be chained over orifices therein, or they may be located inside thereof and arranged to slide back and forth. If desired, they may be provided with locks to prevent mineral from being surreptitiously withdrawn from the receptacle in which it is collected. The modified ascending cylinder (shown in Fig. 13 of the drawings) also shows one of the doors $F^2$.

The main mass of the débris which is carried through cylinder B and projected across the screen S of cylinder C, together with the fine débris discharged from cylinder C by the agency of water and the revolution of the machine, is caught by the inclined ledges K', attached to the inner peripheral face of the inner end of cylinder D, and by them delivered to the worm L', encircling the interior walls of the said cylinder. This worm carries the whole mass of débris forward and delivers it into the chamber E, or, when the latter is not employed, pours into any other receptacle or upon the ground. The ledges K' have the twofold function of carrying the débris forward and of saving gold by acting as dashers to wash fine particles thereof back into the mineral-receptacle C. A ridge, M', formed immediately back of the ledges K' is also designed to prevent the escape of mineral from the machine; and further, in order that all particles of gold that have passed beyond the said ridge may be washed back into cylinder C without obstruction, the interior of the cylinder D is adapted to form an inclined plane, $A^2$, extending from the outer edge of the cylinder D to the said ridge. When the apparatus is modified as shown in Fig. 13 the ridge above described is not necessary.

The worm L' is angular in shape, and consists of a thin blade of cast or of sheet iron set up on its edge within the cylinder. It performs, as aforesaid, the important function of carrying the débris forward. Openings T' (shown in Fig. 6 of the drawings) are formed in the lower edge of the worm L' in order that an opportunity may be given to particles of mineral and water contained in the débris of being carried forward and upward toward the mouth of cylinder D, to be returned by the inclined wall of the said cylinder to the mineral-receptacle C.

The cylinder E, into which the débris is conveyed from cylinder D, is provided with radially-reciprocating rods N', interposed between a series of fixed rods, O'. The movable rods N' are supported at each end in loops P', which allow them to reciprocate as the cylinder revolves. In case the said rods become clogged and fail to fall when they are raised to the top of the cylinder, they are forced to do so by a rod, Q'. (Shown in Fig. 4 of the drawings.) A worm, S', located within cylinder E, subserves the same purpose as and, although disconnected from it, is virtually a continuation of worm L' of cylinder D. The finer portion of the débris, together with any water that may accompany it, falls between the movable and fixed rods N' and O', constituting the screen of cylinder E, and is received on guides or deflectors $T^2$, which convey it into a sluice, U', provided with a perforated false bottom, V'. The stones, bowlders, and other substances too large to pass between the rods N' and O', as aforesaid, are discharged from the outer end of the cylinder E, and are received on a fender, W', from which they fall to the ground by their own gravity. The said fender W' is shown in Fig. 2 of the drawings.

The guides or deflectors $T^2$, before described, may, if desired, be coated with a film of any suitable amalgamator to enable them to take up any fine particles of mineral that may have escaped the process of the apparatus.

Water may be directly introduced into the cylinder E by means of a trough, X'. (Shown in Fig. 4 of the drawings.) This trough, which may be located at the side of or above the cylinder E, is connected with a water-supply through any convenient system of conduits.

While the screen of cylinder E is preferably constructed, as shown, of fixed and movable rods, a screen of wire mesh or perforated iron may be substituted with good results. However, when such construction is resorted to it will be generally necessary, in order to prevent the cylinder from clogging, to provide it with pounding mechanism similar to that provided for keeping the separating devices of cylinder C unobstructed.

It was stated at the outset of this description that the machine might be successfully operated without employing water, but that the wet was preferable to the dry process when water (a small quantity sufficing) could be obtained.

As before explained, water may be directly conducted into cylinder E, and it is apparent that it may be introduced in desirable quantities into the apparatus through the open end of cylinder A. Also, by means of pipes $B^2$ and $C^2$, water and steam may be conveyed into the interior of the apparatus and thrown thereinto in the form of jets, sheets, or spray, depending on the shape of the perforations in the pipes. The water-pipe $B^2$, which is supported from a point without the apparatus, is provided with two arms, $D^2 E^2$, respectively adapted to throw water into cylinder D, to wash into cylinder C any particle of mineral that may have escaped it, and to continually project water onto the ascending side of cylinder C. The inner end of the steam-pipe $C^2$ is inserted in a ring, U, secured to the deflecting-disk T. The said ring is not necessarily attached to the disk, as shown, but may be suspended in the center of the apparatus by other means. The pipe aforesaid is perforated throughout its length to allow the escape of steam, which is supplied thereto from any suitable generator.

In the treatment of débris containing clay or similar earths, steam, which is, as known, a powerful disintegrator, will be found to be an efficient auxiliary.

The pipes $B^2$ and $C^2$ may be used in conjunction or not, as may be found necessary.

When the aid of steam is deemed unnecessary the pipes $C^2$ and $B^2$ may be withdrawn and an imperforate water-pipe provided with perforate arms similar to the arms $D^2 E^2$ of pipe $B^2$ may be substituted in the place of pipe $C^2$.

The steam and water pipes are provided with suitable valves, not shown in the drawings, but located without the apparatus at some point where they can be easily manipulated to regulate the amount of water or steam, as the case may be, which flows into the apparatus. The water-pipes should be inclined slightly to accelerate the flow of water and give it head enough to spray with some force. If the water is under considerable head, this feature of construction is unnecessary.

Fig. 13 of the drawings shows a modification of cylinder D, by means of which it is increased in diameter, and thus better adapted to receive the water and steam pipes $B^2$ and $C^2$, and also to save a higher per cent. of gold, especially when the strictly dry process is employed. Instead of being constructed in one section and having a flaring inner end to form the rear half of cylinder C, it is formed in two sections, $G^2$ and D, bolted together. Of these sections the section $G^2$ forms the rear half of cylinder C, and is further provided with a flange, $H^2$, to which the said section D, constituting the main portion of the cylinder, is bolted, as aforesaid. The section D is also provided with one or more annular channels, $I^2$, adapted to receive and retain mineral. Suitable doors, $J^2$, are provided to permit the collected mineral to be withdrawn from the said channels.

In constructing a machine in accordance with my invention, when weight is not an objection, I prefer to make the cylinders A, B, C, and D of cast-iron and the frame supporting it of wrought-iron; but if a light machine is required the cylinders, as aforesaid, may be made of sheet-iron. The devices within the cylinder may be of any suitable metal. In the manner of mounting and actuating the cylinders I have obviated two serious objections to this class of apparatus. It is very important to keep oil from the operative parts of the machine, as if present it seriously affects the process of the extraction of mineral from the débris. By placing the bearings entirely without the machine, as I have done herein, all possibility of thus mingling oil with the débris is avoided. Again, by means of the bevel-teeth and wheel at the side of the apparatus the shaft is removed from the mouth thereof, the débris is not impeded, better leverage is obtained, and the motive power may be more conveniently applied.

It is not necessary to the successful operation of the machine that all of the different elements contained in it should be employed, or even combined exactly as shown in the drawings, for although ordinarily the concerted action of all parts will save the largest per cent. of the mineral it enhances the initial cost of the machine and renders it heavier, and it will under some circumstances, dependent upon the character of the débris and the locality of its situation, be economy to save a slightly lower per cent. of mineral and employ a simpler machine and one of less cost and weight. This is obtained without departing from my invention by using some only of its component parts. For instance, in most situations the cylinder E may be dispensed with. The dashers Q, the rods M, and the frames $R^2$ of cylinder B may be omitted in whole or in part, and when entirely omitted may be substituted by a worm. Again, the less important elements, as slides and ball-valves, may be omitted from mineral-receptacle C.

When the apparatus is used without the cylinder E sweeps consisting of radial arms adapted to throw the tailings aside, and thus prevent the accumulation thereof under the apparatus, are attached to the outer end of the cylinder D.

It has been explained herein that when water is employed as an auxiliary aid to the process it may be introduced into the machine through cylinder E, through cylinder D, or through pipes penetrating the apparatus and adapted to spray it against the inner faces of the cylinders.

At the outset of this description it was stated that water was not an absolute necessity to the successful operation of the apparatus; but attention must be called to the admirable adaptation of the machine to its use, for it will be observed by reference to the drawings that when water is employed every particle of débris is forced out of the apparatus against a water-current, thus most effectually and perfectly eliminating all particles of mineral contained in it.

Attention must also be called to the system of inclined planes, which, with or without the aid of water, assist the natural force of gravitation in conveying the heavy particles of the débris to the mineral-receptacle C, in which is found the lowest point of all the cylinders.

When the water is scarce, as in many placer-mining districts, and it is necessary to economize its use, devices may be arranged to repeatedly carry the same supply through the apparatus.

Inasmuch as the description of the apparatus has been fully interspersed with its *modus operandi*, a further exposition of the latter will be unnecessary, save only to remark that in clearing up a rocking motion is employed to precipitate every particle of mineral and of débris to the bottom of the machine.

The requirements demanded of machines of this character are not always the same, owing to local conditions and the varying character of the ore or débris to be treated. Therefore modifications of the apparatus will often be necessary to conform it to the circumstances of different instances of its use.

I would have it understood that I do not limit myself to the exact construction, arrangement, and combination of parts herein shown and described, but hold myself at liberty to make such changes and alterations as come within the spirit and scope of my invention.

I do not claim broadly in this application the combination, with two conical shells, of a cage of rods arranged within said shells; nor the combination, with two converging conical shells, of pipes for steam or water; nor the semicircular bearings of the conical shells, as I purpose filing a separate application for Letters Patent embodying a separator adapted to be revolved and operated in a somewhat similar manner to the hereinbefore-described machine, and provided with many detail features of construction substantially similar to features herein shown and described; and I therefore reserve to myself the right to file such subsequent application, claiming novel features and combinations shown but not claimed in the present application.

Having fully described my invention, what I claim as new, and desire to secure by Letters Patent, is—

1. In a mineral-separator, two cylinders arranged to have their inclined planes converge, and having a chamber of greater diameter than themselves interposed between them, substantially as set forth.

2. In a mineral-separator, two cylinders having their flaring inner ends united to form an interposing chamber of greater diameter than themselves, substantially as set forth.

3. In a mineral-separator, the combination, with a series of cylinders having a descending and an ascending plane, of a receiver attached to the cylinder or cylinders of the descending plane, and guides parallel with each other, but inclined to the axis of the receiver's rotation, secured to its inner periphery, substantially as set forth.

4. In a mineral-separator, the combination, with a series of cylinders having a descending and an ascending plane, of a series of rods located within the cylinder or cylinders of the descending plane and arranged to divide it into two chambers, substantially as set forth.

5. In a mineral-separator, the combination, with a series of cylinders having a descending and an ascending plane, of a series of rods located within the cylinder or cylinders of the descending plane and adapted to divide it into two chambers, and dashers arranged to extend into the inner of said chambers, substantially as set forth.

6. In a mineral-separator, the combination, with a cylinder, of dashers having their concaved inner portions extending toward the center thereof, substantially as set forth.

7. In a mineral-separator, the combination, with a cylinder, of a series of rods arranged to divide it into two concentric chambers, and imperforate dashers interposed between said rods and having their lower edges cut away, and their inner portions, which extend into the central chamber, concaved, substantially as set forth.

8. In a mineral-separator, the combination, with a series of cylinders having a descending and an ascending plane, of a series of rods located within the cylinder or cylinders of the descending plane and arranged to divide it into two chambers, concaved dashers extending into the inner of said chambers, and frames arranged to act in concert with said dashers in forwarding the ore being treated toward the ascending plane of the cylinders, substantially as set forth.

9. In a mineral-separator, the combination, with a cylinder, of a series of rods arranged to divide it into two chambers, and concaved dashers and frames interposed between said rods and extending into the inner chamber formed by the rods, the said rods and dashers being arranged to form a space between them wider than the space between any two rods to allow débris to pass from the outer chamber and be received on the concaved portions of the dashers, substantially as set forth.

10. In a mineral-separator, the combination, with a cylinder, of a disk located therein and adapted to deflect throughout it the débris from the receiver, and a ring attached to the rear face of the said disk and adapted to support a steam or water pipe, substantially as set forth.

11. In a mineral-separator, the combination, with two cylinders the descending and ascending planes of which are arranged to converge and having their flaring inner ends united to form a chamber or mineral-receptacle therein, of a screen adapted to separate the said mineral-chamber from the said cylinders between which it is interposed, substantially as set forth.

12. In a mineral-separator, the combination, with a mineral-receptacle, of two concentric plates dividing the receptacle into three compartments, and a series of conical passages interposed between the two plates and providing communication between the outer and inner of said compartments, substantially as set forth.

13. In a mineral-separator, the combination, with a mineral-receptacle, of two concentric plates dividing the receptacle into three compartments, said plates being transversely cut away to form passages between the inner and outer of the compartments, substantially as set forth.

14. In a mineral-separator, the combination, with a mineral-receptacle divided into two or more concentric compartments, of conical passages providing communication between the said compartments, and inclined annular rims located within said passages and having their smaller ends contiguous to the larger ends of the passages, substantially as set forth.

15. In a mineral-separator, the combination, with a mineral-receptacle divided into two or more concentric compartments, of conical passages providing communication between said compartments, inclined annular rims located within and having their smaller ends contiguous to the larger ends of the said passages, balls adapted to engage with the smaller ends of the rims, and wires to retain the said balls within the conical passages, substantially as set forth.

16. In a mineral-separator, the combination, with a mineral-receptacle divided into two or more compartments by concentric plates, said plates being transversely cut away to form passages between the inner and outer compartments, of slides adapted to be reciprocated in said passages by the rotary motion of the separator, substantially as set forth.

17. In a mineral-separator, the combination, with a mineral-receptacle divided into compartments by concentric plates, said plates being cut away transversely to form passages connecting the inner and outer of said compartments, of screens covering spouts adapted to discharge water into the said passages, substantially as set forth.

18. In a mineral-separator, the combination, with a mineral-receptacle divided into compartments by concentric plates, said plates being cut away transversely to form passages, of slides adapted to reciprocate in said passages, and screens covering spouts adapted to discharge water into the passages, substantially as set forth.

19. In a mineral-separator, the combination, with a mineral-receptacle divided by plates into compartments which are connected by conical passages and transverse passages, of wings or agitators located in the inner of the compartments to agitate and direct its contents toward the said conical and transverse passages, substantially as set forth.

20. In a mineral-separator, the combination, with a mineral-receptacle consisting of a cylindrical chamber interposed between two chambers of lesser diameter, of a screen separating it from the chambers aforesaid, concentric plates dividing it into compartments, said plates being cut transversely to form passages in which slides are adapted to reciprocate, conical passages connecting the compartments, inclined annular rims located within and having their smaller ends contiguous to the larger ends of the said conical passages, and balls adapted to close the smaller ends of the rims and to be retained within the wings or agitators located in the inner compartment of the receptacle, substantially as set forth.

21. In a mineral-separator, the combination, with a mineral-receptacle divided by concentric plates into compartments which are connected by transverse passages cut in the said plates, of slides adapted to be reciprocated in said passages and having their lower ends cut away in order not to break the continuity of the outer compartment, substantially as set forth.

22. In a mineral-separator, the combination, with a mineral-receptacle consisting of a cylindrical chamber interposed between two cylinders of lesser diameter, of doors located in the sides of the receptacle, allowing the collected mineral to be withdrawn therefrom, substantially as set forth.

23. In a mineral-separator, the combination, with a cylinder forming the ascending plane of the separator, of guides parallel with each other, but inclined to the axis of the said cylinder's rotation, attached to its inner face and near its inner end, substantially as set forth.

24. In a mineral-separator, the combination, with a cylinder forming the ascending plane of the separator, of guides attached to its inner face and near its inner end, and a ledge encircling the cylinder at a point near the outer ends of the said guides, substantially as set forth.

25. In a mineral-separator, the combination, with a cylinder forming the ascending plane of the separator and having an inclined plane extending from its outer end to the top of a ledge encircling its inner peripheral face, of guides parallel with each other, but inclined to the axis of the cylinder's rotation and located between the inner end of the cylinder and the ledge aforesaid, substantially as set forth.

26. In a mineral-separator, the combination, with a cylinder forming the ascending plane of the separator, of a worm to carry débris forward up the ascending plane of the cylinder, said worm being adapted to allow fine particles of mineral to pass between it and the inner face of the cylinder to which it is attached.

27. In a mineral-separator, the combination, with a series of cylinders having their inclined planes converged and having a cylinder of greater diameter interposed between them, of a water-pipe inserted into the cylinders and adapted to project water into the ascending side of the interposing cylinder, substantially as set forth.

28. In a mineral-separator, the combination, with a series of cylinders having their inclined planes converged and having a cylinder of greater diameter interposed between them, of a water-pipe inserted into the cylinder to project water into the cylinder of the ascending plane, substantially as set forth.

29. In a mineral-separator, the combination, with a series of cylinders having their inclined planes converged and having a cylinder of greater diameter interposed between them, of a water-pipe provided with two spraying-arms and adapted to spray jets of water into the ascending side of the interposed cylinder and into the cylinder of the ascending plane, substantially as set forth.

30. In a mineral-separator, the combination, with a series of cylinders having their inclined planes converged and having a cylinder of greater diameter interposed between them, of a steam-pipe inserted into the cylinder, substantially as set forth.

31. In a mineral-separator, a cylindrical screen consisting of alternating fixed and radially-reciprocating rods, substantially as set forth.

32. In a mineral-separator, the combination, with a series of fixed rods, of a series of reciprocating rods interposed between them, and loops secured to the opposite ends of the screen-frame to support the ends of the reciprocating rods, substantially as set forth.

33. In a mineral-separator, the combination, with a series of alternating, fixed, and radially-reciprocating rods, of a band or rod extending over the top of the screen and forcing the reciprocating rods down when they fail to fall of their own gravity, substantially as set forth.

34. In a mineral-separator, a screen consisting of a series of alternating, fixed, and radially-reciprocating rods and a trough to supply water to it, substantially as set forth.

35. In a mineral-separator, the combination, with a screen consisting of a series of alternating, fixed, and radially-reciprocating rods, of a worm to carry débris through and to discharge it from the said cylinder, substantially as set forth.

36. In a mineral-separator, the combination, with a screen consisting of a series of alternating, fixed, and radially-reciprocating rods, of deflectors located under the screen and a sluice into which they converge, substantially as set forth.

37. In a mineral-separator, the combination, with a screen consisting of a series of alternating, fixed, and radially-reciprocating rods, of deflectors, a sluice, and a fender, substantially as set forth.

38. In a mineral-separator, the combination, with a series of cylinders arranged to form a descending and ascending plane for the débris, of a series of face-teeth encircling one of the said cylinders and a spring-pressed pounder adapted to be actuated by the teeth as the cylinder revolves, substantially as set forth.

In testimony that I claim the foregoing I have hereunto set my hand and seal this 28th day of May, 1881.

JOHN H. WILHELM. [L. S.]

Witnesses:
ENOS MILES,
OTIS O. MILES.